United States Patent

Inoue et al.

[11] Patent Number: 5,995,760
[45] Date of Patent: *Nov. 30, 1999

[54] INTERCHANGEABLE-LENS CAMERA SYSTEM HAVING A WATERPROOF MOUNT MECHANISM, AND PHOTO-TAKING LENS BARREL AND CAMERA BODY USED IN THE CAMERA SYSTEM

[75] Inventors: Yoshiyuki Inoue, Izumi; Hidehiko Fujii, Sakai; Toyotoshi Kawasaki, Kawachinagano; Shinichi Suzuki, Izumi; Tomohiko Kawaji, Osaka; Akihiro Baba, Izumi, all of Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/787,479

[22] Filed: Jan. 22, 1997

[30] Foreign Application Priority Data

Jan. 23, 1996 [JP] Japan .................................. 8-009082

[51] Int. Cl.⁶ .................................................. G03B 17/08
[52] U.S. Cl. ................................................. 396/29; 396/531
[58] Field of Search .............................. 396/25, 29, 529, 396/530, 531

[56] References Cited

U.S. PATENT DOCUMENTS 4,963,902  10/1990  Fukahori .................................. 396/29

FOREIGN PATENT DOCUMENTS 1-111231   7/1989   Japan .
3-11234    2/1991   Japan .
4-9930     1/1992   Japan .

*Primary Examiner*—Howard B. Blankenship
*Attorney, Agent, or Firm*—McDermott, Will & Emery

[57] ABSTRACT

An interchangeable camera system having a waterproof mount mechanism, and a photo-taking lens barrel and camera body used in the interchangeable-lens camera system. A large diameter part 2c which is provided on a lens-side mount surface 2a compresses a sealing member 6 in cooperation with a sealing surface 5c of a camera body 5 so that a gap between the lens-side mount surface 2a and the camera body 5 is sealed by the sealing member 6.

8 Claims, 5 Drawing Sheets

INTERCHANGEABLE-LENS CAMERA SYSTEM HAVING A WATERPROOF MOUNT MECHANISM, AND PHOTO-TAKING LENS BARREL AND CAMERA BODY USED IN THE CAMERA SYSTEM

BACKGROUND OF THE INVENTION

1. Field of the Invention

The present invention pertains to an interchangeable-lens camera system, and more particularly, to an interchangeable-lens camera system having a waterproof mount mechanism, and a photo-taking lens barrel and camera body used in said interchangeable-lens camera system.

2. Description of the Related Art

As conventional waterproof mount mechanisms for an interchangeable-lens camera system, a design in which the gap between the camera body cover and the camera body-side mount surface and the gap between the camera body-side mount surface and lens barrel are individually sealed (Japanese Laid-Open Utility Model Hei 1-111231) and a design in which cylindrical members are located around the mount surfaces of the lens barrel and the camera body such that the cylindrical members are connected, with one placed inside the other, and in which a sealing member such as an O-ring is used for the gap between the cylindrical members (Japanese Laid-Open Utility Model Hei 3-11234 and Hei 4-9930) are available, for example.

The design of the former utility model, however, uses a double-seal structure in which the gap between the camera body-side mount surface and the camera body cover is sealed in advance and the area of the camera body to which the lens barrel is attached is then sealed, which makes the design complex. With the design of the latter utility model, on the other hand, only one area at which the lens barrel is attached to the camera body is sealed, and therefore, the latter construction is simpler than the former design in terms of how the sealing is achieved. However, because when the photo-taking lens barrel is mounted to the camera body, it is necessary to push the lens barrel into the camera body during a certain stroke while compressing the sealing member between the inner and outer cylindrical members, the feel of the mounting of the lens barrel becomes hard during that stroke.

SUMMARY OF THE INVENTION

The object of the present invention is to provide an interchangeable-lens camera system having an improved waterproof mount mechanism that resolves the problems described above, as well as a photo-taking lens barrel and camera body used in said interchangeable-lens camera system.

Another object of the present invention is to provide an interchangeable-lens camera system having a waterproof mount mechanism that has a simple design and prevents the deterioration of the feel when the lens barrel is mounted to the camera body, as well as a photo-taking lens barrel and camera body used in said interchangeable-lens camera system.

BRIEF DESCRIPTION OF THE DRAWINGS

These and other objects and features of the present invention will become clear from the following description taken in conjunction with the preferred embodiments thereof with reference to the accompanying drawings, in which;

FIG. 3b is a cross-section of sealing member 6 cut along the B—B line in FIG. 3a.

DETAILED DESCRIPTION OF THE PREFERRED EMBODIMENTS

Preferred embodiments of the waterproof mount mechanism for an interchangeable-lens camera system pertaining to the present invention are explained in detail below with reference to FIGS. 1 through 4.

Figure 1:
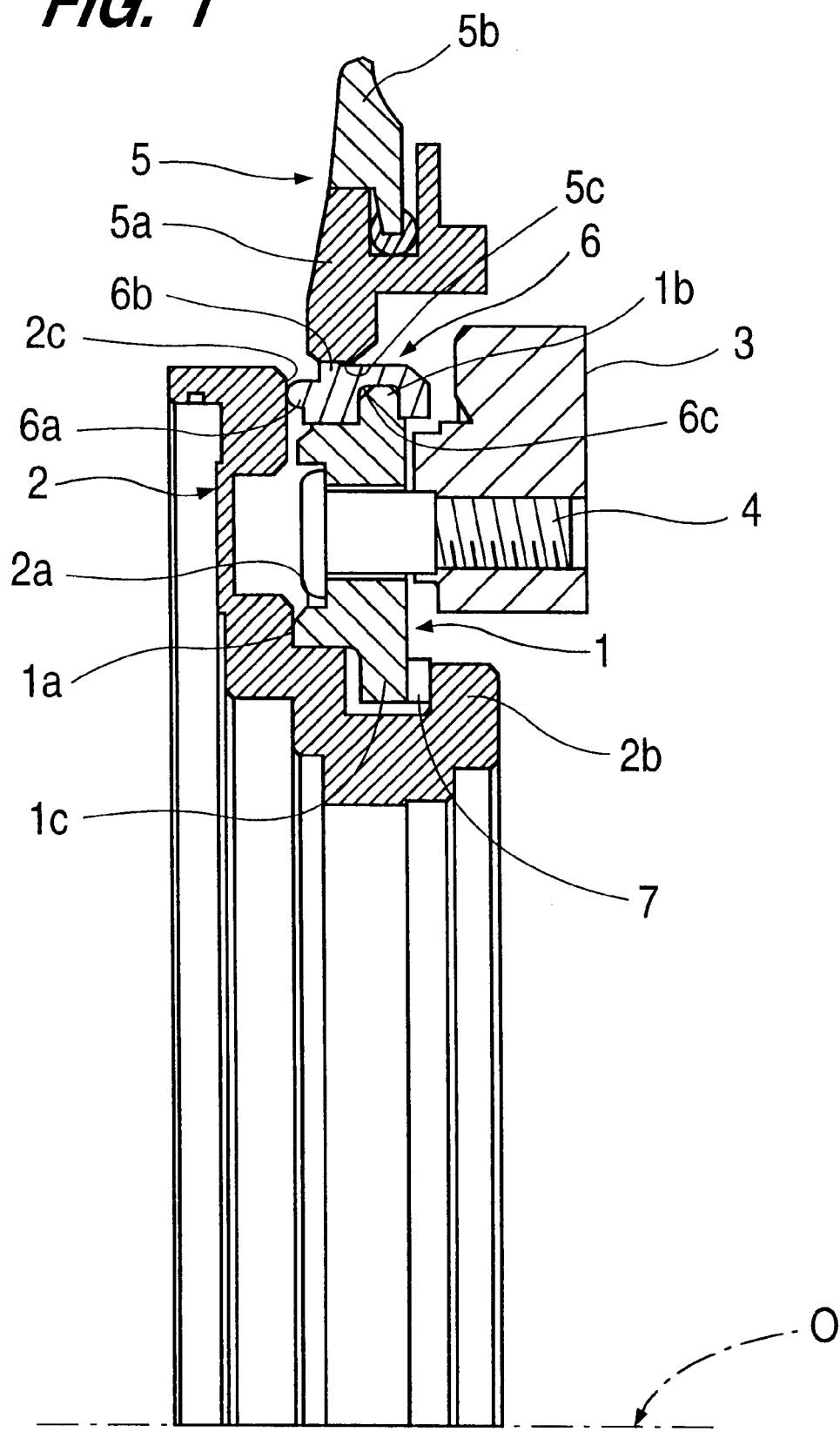
FIG. 1 is an enlarged cross-sectional view showing a part of a waterproof mount mechanism for an interchangeable-lens camera system pertaining to a first embodiment of the present invention.

The first embodiment will be explained first. FIG. 1 is an enlarged cross-sectional view showing a part of the waterproof mount mechanism. In this drawing, 1 is a camera body mount having camera body-side mount surface 1a, and 2 is a lens mount having lens-side mount surface 2a. Both of these mounts are made to be cylindrical, with optical axis O of the lens barrel as the central axis. Camera body mount 1 is fixed to front frame 3, a part of the camera body frame, using screws 4. Camera body cover 5 is attached to the camera body frame, which is not shown in the drawing. Camera body cover 5 is divided into front cover 5a, upper cover 5b, a bottom cover, a side cover, etc. in this embodiment. Only front cover 5a and upper cover 5b are shown in the drawing. Lens mount 2 is attached to a lens barrel not shown in the drawing.

Figure 2:
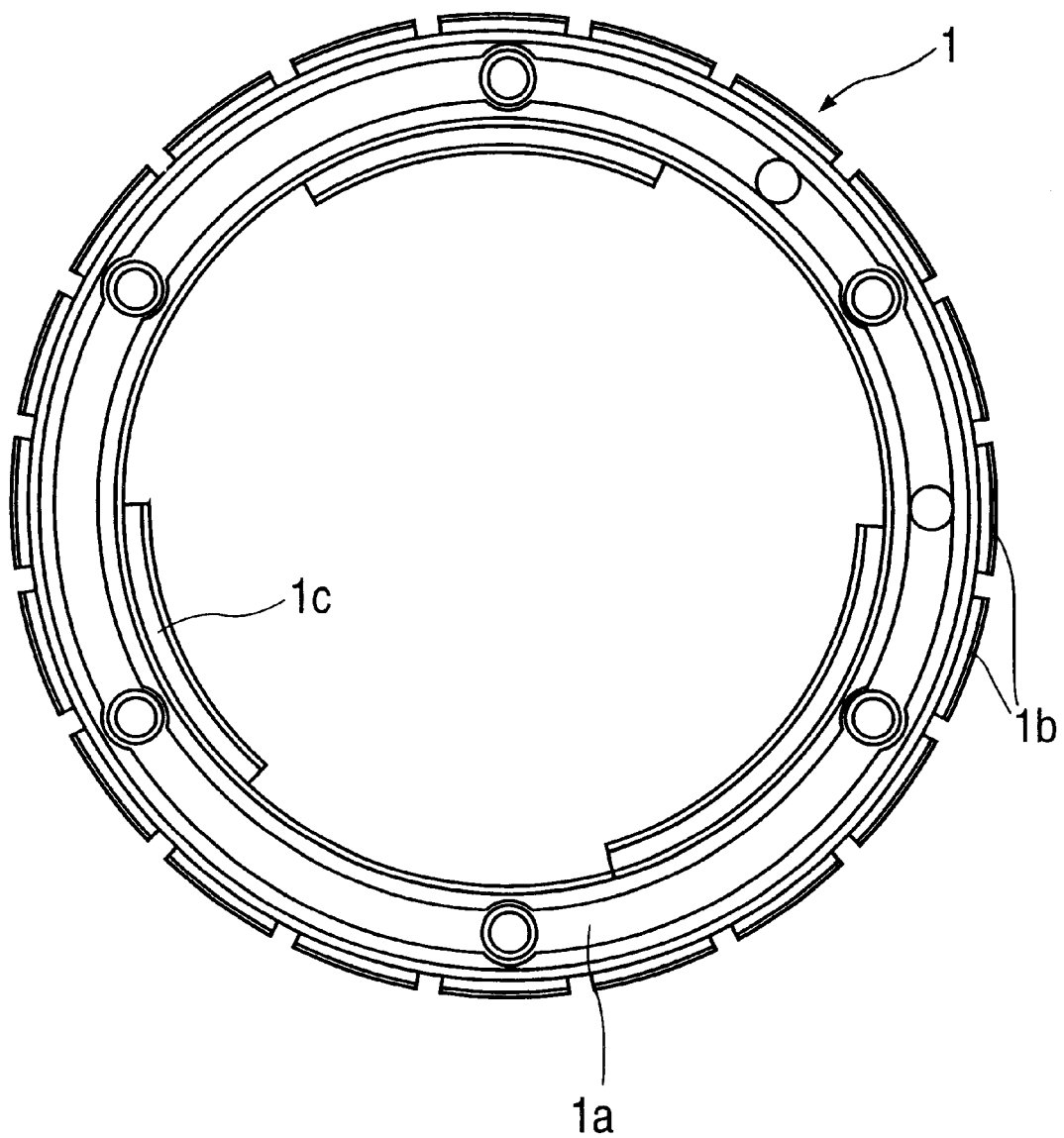
FIG. 2 is a front elevation of the camera body mount of the camera system pertaining to the first embodiment.
Figure 3A:
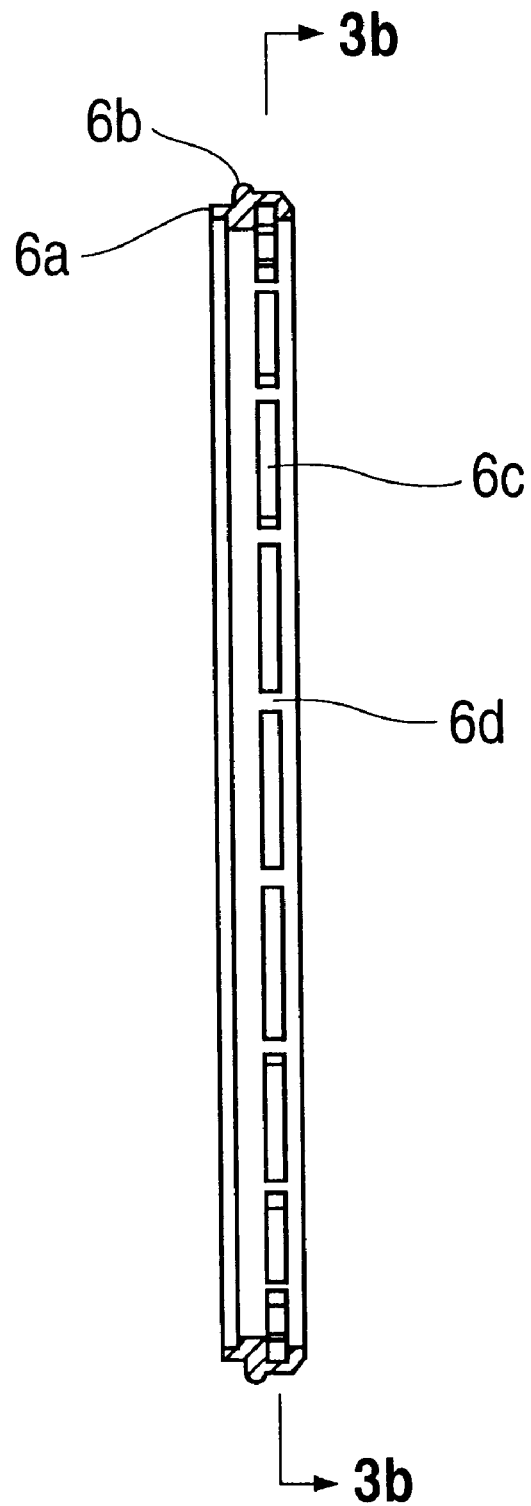
FIG. 3a is a vertical cross-section of sealing member 6.
Figure 3B:
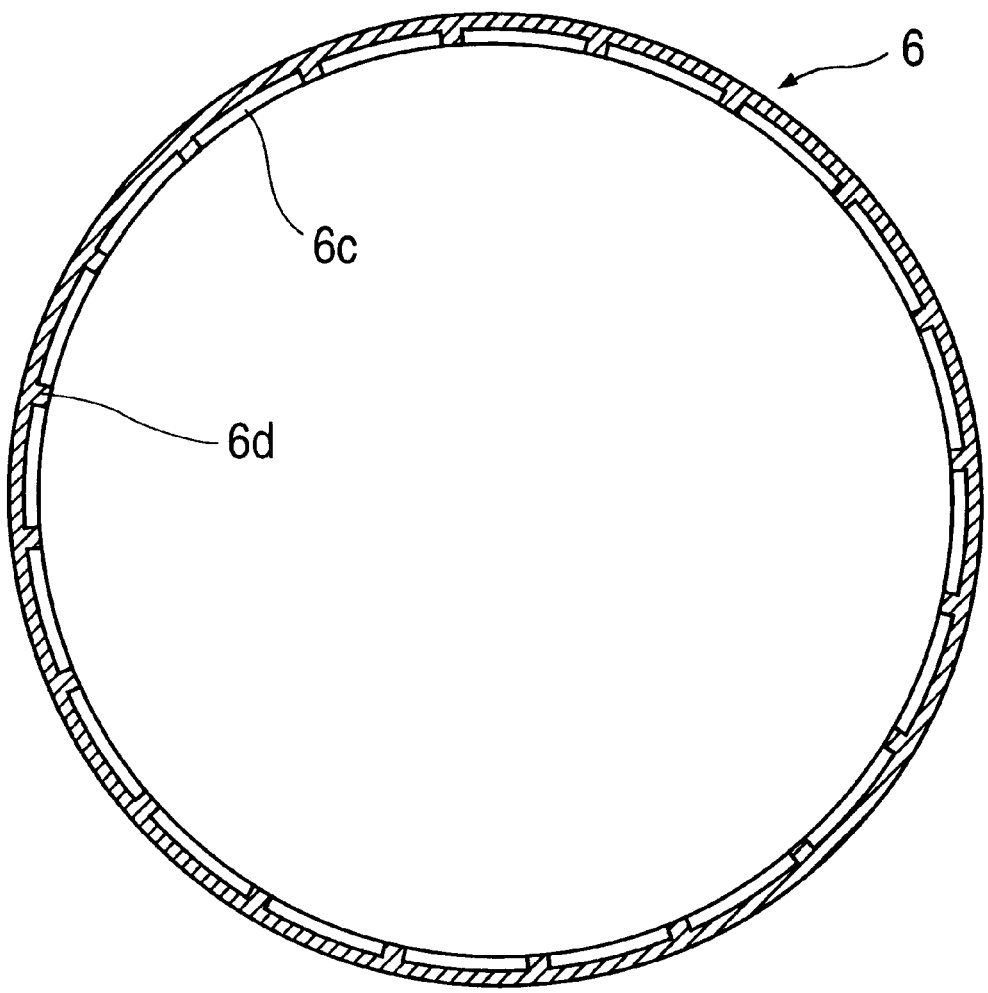

Sealing member 6 is mounted to camera body mount 1. FIG. 2 shows the front elevation (seen from the left of FIG. 1) of body mount 1. FIG. 3a shows a vertical cross-section of sealing member 6 and FIG. 3b shows a cross-section cut along the B—B line of FIG. 3a. Camera body mount 1 has multiple flanges 1b on its outer surface along its circumference for the mounting of sealing member 6. Flanges 1b are intermittently placed on the outer surface of camera body mount 1 along its circumference and a gap is formed between each two adjacent flanges 1b. Sealing member 6 has grooves 6c running along the surface of its inner circumference such that sealing member 6 may be mounted to camera body mount 1 by placing these grooves 6c over flanges 1b of camera body mount 1. Grooves 6c are formed intermittently such that they coincide with flanges 1b. By mounting sealing member 6 to camera body mount 1 by inserting ribs 6d between these grooves 6c into the gaps between flanges 1c, sealing member 6 is prevented from becoming detached from flanges 1b.

Claws 1c are formed at three locations on the inner surface of camera body mount 1 along its circumference, said claws 1c forming a general bayonet-style mounting mechanism together with lens mount 2. Claws 2b that protrude toward the right from mount surface 2a in FIG. 1 are formed at three locations on the outer surface of lens mount 2 along its circumference. The lens barrel may be mounted and affixed to the camera body by rotating the lens barrel while having both mount surfaces 1a and 2a in contact with each other, with claws 1c of camera body mount 1 and claws 2b of lens mount 2 alternating in position. Shown between claws 1c and 2b in FIG. 1 is mount spring 7 that is located on the rear side of claw 1c of camera body mount 1 in order to cause mount surfaces 1a and 2a to press against each other.

In order to seal the gap between lens-side mount surface 2a and camera body cover 5 when the lens barrel is mounted to the camera body, sealing member 6 has first sealing unit 6a that is compressed in the direction parallel to optical axis O and second sealing unit 6b that is compressed in the direction perpendicular to optical axis O. Lens-side mount surface 2a has large diameter part 2c that is larger than the outer diameter of camera body-side mount surface 1a. This large diameter part 2c compresses first sealing unit 6a. Front cover 5a that forms camera body cover 5 compresses second sealing unit 6b of sealing member 6 using sealing surface 5c, the inner surface of front cover 5a. Using the design described above, sealing member 6 seals the gap between lens-side mount surface 2a and camera body cover 5, with camera body mount 1, a support member, housed inside sealing member 6, whereby the entry of water into the camera body may be prevented.

When pressure $F_1$ between mount surfaces 1a and 2a due to mount spring 7 located on the rear side of claw 1c of camera body mount 1, and reaction force $F_2$ that is generated by the compression of sealing member 6, have the relationship $\alpha \times F_1 = F_2$, coefficient $\alpha$ is a number in the range of $0 < \alpha < 1$. Using this design, because reaction force F2 due to the compression of sealing member 6 is set to be smaller than pressure $F_1$ by means of mount spring 7, mount surfaces 1a and 2a are reliably pressed together. Therefore, the instability in the positioning of lens-side mount surface 2a that would have resulted from the use of sealing member 6 is prevented.

This coefficient $\alpha$ may be set to be any value within the range of $0 < \alpha < 1$ that takes into account a balance of waterproofing capacity and feel of mounting operation. If the value is set to be within the range of $0.1 \leq \alpha 0.15$ in particular, $F_2$ becomes sufficiently smaller than $F_1$, and therefore excessive force is no longer needed when mounting the lens barrel, while sealing member 6 may be compressed with an appropriate amount of force. This ensures adequate waterproofing capability.

Figure 4:
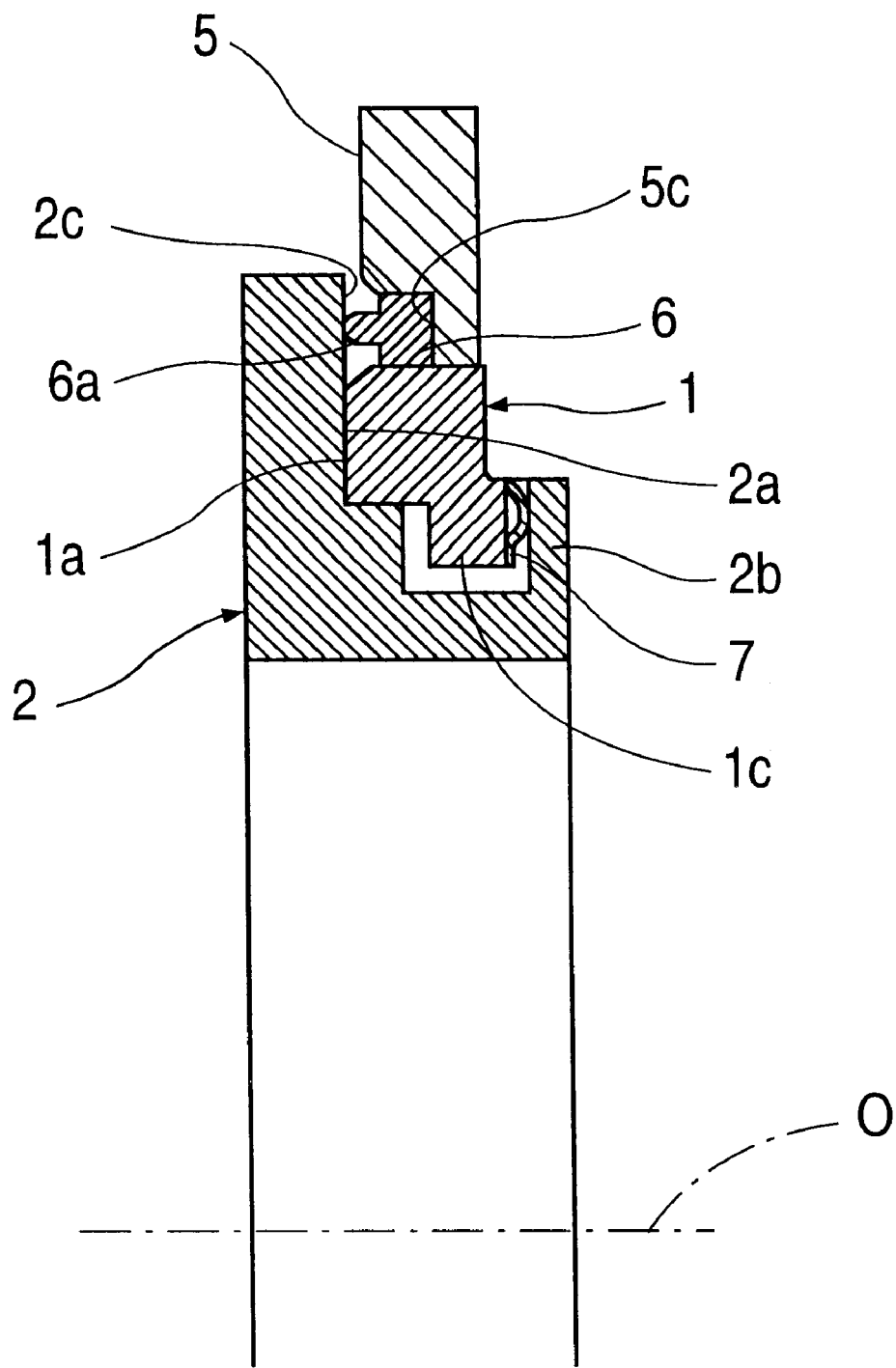
FIG. 4 is an enlarged cross-sectional view showing a part of a waterproof mount mechanism for an interchangeable-lens camera system pertaining to a second embodiment of the present invention.

A second embodiment will now be explained. FIG. 4 is an enlarged cross-sectional view outlining a part of the design of the waterproof mount mechanism pertaining to the second embodiment. In this example, sealing surface 5c of camera body cover 5 is located such that it will face large diameter part 2c of lens-side mount surface 2a. Sealing member 6 has only one sealing unit 6a, and is placed such that this sealing unit 6a will be compressed between large diameter part 2c of lens-side mount surface 2a and sealing surface 5c in the direction parallel to optical axis O of the lens barrel. Sealing surface 5c comprises a bottom surface of a ring-shaped groove formed on the front side of camera body cover 5. Sealing member 6 is fixed in this groove using a method such as gluing. In this example, the outer diameter of lens-side mount surface 2a is larger not only than the outer diameter of camera body-side mount surface 1a but also than the outer diameter of sealing member 6 that is located around camera body-side mount surface 1a. Consequently, when the lens barrel is mounted to the camera body, sealing member 6 becomes hidden and invisible from the outside.

The mounting of the lens barrel to the camera body is achieved by causing mount surfaces 1a and 2a to be pressed together with claws 2b of lens mount 2 and claws 1c of camera body mount 1 alternating in position and by then rotating the lens barrel, in the same manner as the conventional general bayonet mount mechanism. As mount surfaces 1a and 2a are made to come closer to each other, large diameter part 2c of lens-side mount surface 2a first comes into contact with sealing unit 6a of sealing member 6. From that position until mount surfaces 1a and 2a come into contact with each other, sealing member 6 gradually becomes compressed. In other words, if sealing member 6 is compressed until mount surfaces 1a and 2a come into contact with each other and the lens barrel is then rotated, waterproofing is completed at the same time as the mounting of the lens barrel. As described above, the stroke during which the lens barrel is pushed with the sealing member being compressed, which is needed in the conventional waterproof mount mechanism in which a sealing member such as an O-ring is used between the cylindrical members that are placed one inside the other, is made unnecessary. Therefore, the change in the feel when the lens barrel is being mounted may be made smaller than in the conventional model.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An interchangeable-lens camera system comprising:
    a camera body provided with a camera body-side mount surface;
    a photo-taking lens provided with a lens-side mount surface on a lens barrel of the photo-taking lens, the photo-taking lens capable of being mounted to the camera body with the camera body-side mount surface and the lens-side mount surface pressed together;
    a large diameter part forming a part of the lens-side mount surface,
        wherein the outer diameter of the large diameter part is larger than the outer diameter of the camera body-side mount surface;
    a part of the camera body located outside of the camera body-side mount surface,
        wherein the part of the camera body comes close to the large diameter part when the photo-taking lens is mounted to the camera body; and
    a sealing member which is placed in a gap between the large diameter part and the part of the camera body when the photo-taking lens is mounted to the camera body, in order to seal the gap between the large diameter part and the part of the camera body.

2. The camera system as claimed in claim 1, wherein, when the photo-taking lens is mounted to the camera body, the part of the camera body faces the large diameter part through the sealing member which is compressed between the large diameter part and the part of the camera body in the direction parallel to the optical axis of the lens barrel of the photo-taking lens.

3. The camera system as claimed in claim 2, further comprising,
    a pressing member which causes the lens-side mount surface and the camera body-side mount surface to come into contact with each other under pressure $F_1$ when the photo-taking lens is mounted to the camera body,
    wherein, when said pressure $F_1$ and reaction force $F_2$, which is generated due to the compression of the sealing member, have a relationship defined as $\alpha \times F_1 = F_2$, the value of coefficient $\alpha$ is set within the range of $0 < \alpha < 1$.

4. The camera system as claimed in claim 3, wherein said coefficient a is set within the range of $0.1 \leq \alpha \leq 0.15$.

5. The camera system as claimed in claim 1, wherein said large diameter part includes a surface parallel to the lens-side mount surface, the surface of said large diameter part being in contact with the sealing member when the photo-taking lens is mounted to the camera body.

6. An interchangeable-lens camera system in which a photo-taking lens is mounted to a camera body with a camera body-side mount surface on the camera body and a lens-side mount surface on a lens barrel of the photo-taking lens pressed together, said camera system comprising:

a large diameter part forming a part of the lens-side mount surface, wherein the outer diameter of said large diameter part is larger than the outer diameter of the camera body-side mount surface;

a sealing surface located on the camera body, wherein said sealing surface comes close to the large diameter part when the photo-taking lens is mounted to the camera body; and a sealing member which is placed in a gap between the large diameter part, the sealing surface and the camera body-side mount surface when the photo-taking lens is mounted to the camera body, in order to seal the gap between the large diameter part, the sealing surface and the camera body-side mount surface.

7. A camera body used in an interchangeable-lens camera system comprising the camera body and a photo-taking lens, the camera body comprising:

a camera body-side mount surface on the camera body that comes into pressure contact with a lens-side mount surface of a lens barrel of the photo-taking lens when the photo-taking lens is mounted to the camera body;

a part of the camera body located outside of the camera body-side mount surface, and a sealing member, wherein when the photo-taking lens is mounted to the camera body, the part of the camera body comes close to a large diameter part forming a part of the lens-side mount surface, the outer diameter of which is larger than the outer diameter of the camera body-side mount surface such that a gap between the large diameter part and the part of the camera body is formed, said gap being sealed by said sealing member.

8. The camera body as claimed in claim 7, wherein the camera body-side mount surface has a plurality of flanges along its circumference, and the sealing member has a plurality of grooves along an inner circumference that coincide with the flanges, said sealing member is fitted on the camera body-side mount surface by fitting the grooves over the flanges.

* * * * *

UNITED STATES PATENT AND TRADEMARK OFFICE
CERTIFICATE OF CORRECTION

PATENT NO. : 5,995,760
DATED : November 30, 1999
INVENTOR(S) : Inoue et al.

It is certified that error appears in the above-identified patent and that said Letters Patent is hereby corrected as shown below:

Claim 4, line 2, change "a" to --α--.

Signed and Sealed this

Seventh Day of November, 2000

Attest:

Q. TODD DICKINSON

*Attesting Officer*   *Director of Patents and Trademarks*